United States Patent Office 2,800,464
Patented July 23, 1957

2,800,464

ADDITION OF ACID TO HALT POLYURETHANE PRODUCING REACTION

Alfred L. Miller, Roselle, N. J., assignor to Celanese Corporation of America, New York, N. Y., a corporation of Delaware No Drawing. Application April 11, 1952, Serial No. 281,887

6 Claims. (Cl. 260—77.5)

This invention relates to the production of polymers and relates more particularly to a process for the production of polymers of improved thermal stability.

An important object of this invention is to provide a novel process for the production of polymers of improved thermal stability.

A further object of this invention is to provide a process for the production of polyurethanes of improved thermal stability by the reaction of a bis-chloroformate and a polyamine in a heterogeneous reaction system.

Other objects of this invention will be apparent from the following detailed description and claims.

It has previously been proposed to produce polyurethanes by the polymerization of a bis-chloroformate and a polyamine. According to one process that has been suggested for carrying out this polymerization in a heterogeneous reaction medium, there are mixed together, with vigorous stirring and preferably in the presence of an emulsifying agent, an aqueous solution of a polyamine and a water-immiscible organic solvent solution of a bis-chloroformate. There is also added to the polymerization mixture an acid binding agent to react with the hydrochloric acid that is liberated as the polymerization proceeds. The polymer precipitates from the reaction mixture as it is formed to produce a slurry. As set forth in Jones et al. application S. No. 177,763, filed December 3, 1951, now Patent No. 2,660,574, there may be present initially in the polymerization mixture a sufficient quantity of an acid material to prevent the reaction from proceeding, and the polymerization may be caused to take place by introducing an alkaline material into the polymerization mixture.

It has now been discovered that polyurethanes of improved thermal stability may be prepared by the foregoing processes if the polymerization is interrupted before it has gone to completion. Apparently, in carrying out the polymerization, the polymer produced during the final stages of the reaction is of lower molecular weight than the polymer produced during the early stages of the reaction and will cause a noticeable impairment in the thermal stability of the final product. By interrupting the polymerization before it has progressed to completion it is possible substantially to prevent the formation of the low molecular weight polymer that is normally formed during the final stages of the reaction and thereby to improve the thermal stability of the product.

The interruption of the polymerization may be effected in a number of different ways. In small scale operations, the polymerization may be interrupted rapidly by filtering the reaction mixture or otherwise treating the same so as to separate physically the already formed polymer from the reaction mixture containing unreacted materials. This method of interrupting the polymerization is not, however, generally applicable to large scale operations because of the difficulties involved in the rapid filtration of large volumes of material. Another and more generally useful method of interrupting the polymerization is to acidify the reaction mixture by adding an acid reacting material thereto. Other chemical methods may also be employed for interrupting the polymerization, the basic criterion for these methods being that they will cause a reaction to take place with the reactive groups of at least one of the reactants to prevent said reactant from entering into the polymerization reaction. For example, the reactive amino groups of the polyamine may be destroyed by reaction with nitrous acid to interrupt the polymerization.

Products of improved intrinsic viscosity and good thermal stability may be obtained by interrupting the polymerization before it has progressed to a point where more than about 95% of the amount of polymer has been formed which would be obtained if the polymerization were allowed to go to completion, but the best results are obtained when the polymerization is interrupted before it has progressed to a point where more than about 90% of this amount of polymer has been formed. In general, the interruption of the polymerization may be effected within an interval of between about 2 and 8 minutes after it has commenced, although in certain cases where the polymerization is carried out very slowly or with unusual rapidity, a longer or shorter period, respectively, may be necessary. The polymers produced by the process of this invention are characterized by a higher melting point and a higher intrinsic viscosity than polymers produced by prior processes wherein the polymerization is permitted to go substantially to completion. They also exhibit a lower loss in intrinsic viscosity when heated to elevated temperatures, as, for example, during the spinning of the same by melt spinning processes into filaments, yarns, and the like, or during the shaping of the same by molding operations.

The processes of this invention is applicable to the production of polyurethanes by a batch process. It is also applicable to the production of polyurethanes by a continuous process as disclosed, for example, in Swerdloff et al., application S. No. 250,187, filed October 6, 1951, now Patent No. 2,658,886. As set forth in that application, the polyurethane is prepared by introducing continuously into a reaction zone an aqueous solution of a polyamine and an organic solvent solution of a bis-chloroformate, and effecting a polymerization reaction in said zone by continuously and strongly agitating the mixture therein. The slurry formed as the reaction proceeds is withdrawn continuously from the reaction zone at a volumetric rate equal to the volumetric rate at which the solutions are introduced therein. To interrupt the polymerization at a predetermined point, the polymer slurry may be withdrawn continuously from the reaction zone before the polymerization has progressed beyond this point and the slurry may be filtered or otherwise treated to separate the polymer physically from the unreacted material. Alternatively, the polymerization may be interrupted by acidifying the polymer slurry or otherwise chemically treating the same to destroy or tie up at least one of the reactants.

The temperature of the solution undergoing polymerization is advantageously maintained at from about 0° to 25° C. or 35° C. to obtain the maximum yield of polymer of high molecular weight. However, lower temperatures down to about $-10°$ C. or even lower may also be employed by adding a suitable antifreeze agent such as methanol, ethylene glycol, glycerine, acetone or dioxane to the aqueous polyamine solution and forming the bis-chloroformate solution with an organic solvent having a freezing point below the temperature at which the polymerization is carried out. Higher temperatures may also be employed for carrying out the polymerization, but are somewhat less desirable in that they result in a lower yield of polymer having a lower and less uniform molecular weight.

In forming the organic solvent solution of the bis-chloroformate, there may be employed a wide variety of water-immiscible solvents. Suitable solvents include benzene, toluene, xylene, chloroform, carbon tetrachloride, octane, naphthene, and the hydrocarbon mixture of aromatics, paraffins and naphthalenes sold under the name "Varsol." Aromatic solvents, particularly toluene, are preferred for this purpose since they result in a maximum yield of polymer of the desired molecular weight.

During the polymerization reaction, hydrochloric acid is liberated and reacts with the alkaline agent that is introduced into the reaction zone together with the polyamine and the bis-chloroformate. Preferably, the alkaline agent is employed in excess of that required exactly to neutralize all of the hydrochloric acid formed. Depending upon the specific alkaline agent, the optimum results with regard to yield are obtained with a molar excess of up to about 100%. Suitable alkaline agents that may be employed, in addition to sodium hydroxide and sodium carbonate, are an excess of the polyamine, itself; the soluble alkali metal or alkaline earth metal oxides, hydroxides, and carbonates, such as potassium hydroxide, barium hydroxide, disodium phosphate and trisodium phosphate, quaternary ammonium bases and the like. The alkaline agent may be dissolved in the aqueous polyamine solution before the latter is introduced into the reaction zone, or it may be introduced into the reaction zone in the form of a separate solution.

The process of the present invention is particularly advantageous in that it permits the polymerization to be carried out at a high pH, i. e., at a pH of above 10 or between 12 and 13. Despite the extremely high alkalinity of these polymerization mixtures, no degradation of the polymer takes place as with prior processes, apparently because of the interruption of the polymerization after it has progressed to the desired extent, i. e., prior to completion.

Various types of emulsifying agents may be introduced into the reaction zone, either in solution with one of the reactants or separately, to assist in effecting a uniform and rapid emulsification of the reactant solutions. Examples of suitable emulsifying agents are ethylene oxide condensates with long chain fatty alcohols, esters of sodium sulfosuccinic acid such as the dioctyl ester, long chain fatty acid esters of polyethylene glycol, ethylene oxide condensates with castor oil, long chain monoglycerides, alkyl aryl polyether alcohols, e. g. the reaction product of ethylene oxide and xylenol, sorbitan monolaurate, the condensation product of sorbitan monolaurate with ethylene oxide, mono- or poly-alkyl naphthalene sulfonates, sulfates of fatty acid monoglycerides or the glycol esters of long chain fatty acids. It is important, for the production of polymers of good color, that the emulsifying agent be as free as possible of colored bodies, as the polymer tends to scavenge colored bodies from the emulsifying agent and the reaction mixture. The most advantageous results are obtained, however, by employing emulsifying agents comprising the sodium salts of sulfated long chain alcohols, such as sodium lauryl sulfate, sodium octyl sulfate, sodium oleyl sulfate and the like. Other emulsifying agents that may be employed include the sodium salt of an N-substituted amino-ethane-sulfonic acid, i. e. an N-substituted taurine. The substituents on the nitrogen may include both alkyl groups, such as methyl, ethyl, propyl, butyl, amyl, hexyl, heptyl, octyl, decyl, undecyl, dodecyl, etc., and acidyl groups. The acidyl group, when present, is preferably the acidyl group of a long chain saturated or unsaturated aliphatic acid containing six to eighteen carbon atoms. Examples of said acids are lauric, oleic, ricinoleic, linoleic, caproic, pimelic, heptylic, undecylic and stearic acid. Good results are achieved by employing the sodium salt of N-butyl, N-lauroyl-β-amino-ethane sulfonic acid as the emulsifying agent. The amount of emulsifying agent employed is preferably from about 4.5 to 10.5 grams/gram mole of reactants on a 100% strength basis.

Examples of diamines which may be employed in forming polyurethanes in accordance with the novel polymerization process of our invention are ethylene diamine, trimethylene diamine, tetramethylene diamine, pentamethylene diamine, hexamethylene diamine, ortho-, meta- or para-phenylene diamine, cyclohexylene diamine and nuclearly substituted phenylene diamines and nuclearly substituted cyclohexylene diamines. N-substituted diamines which contain a free amino hydrogen on each amino group are also suitable.

Other diamines which may also be employed are, for example, α,ω-di-(3-aminopropoxy)-alkanes, such as 1,4-di-(3-aminopropoxy)-butane, bis-(ω-amino-alkyl) ethers such as 3,3'-diamino-di-propyl ether, 4,4'-diamino-dicyclohexyl methane, bis-(ω-amino-alkyl) sulfides such as 2,2'-diamino-diethyl-sulfide, 1,2-, 1,3- 1-4-α,α'-diamino xylene or other ω,ω'-diamine-dialkyl benzene, diamino-naphthalene, diamino-biphenyl, ω,ω'-diamino-dialkyl biphenyls, ω-amino-alkyl anilines, ω-amino-alkylcyclohexylamines, bis-(ω-amino-alkoxy)-benzene, bis-(ω-amino-alkoxy)-cyclohexane; 4,4'-diamino-dicyclohexyl sulfones, ω,ω'-sulfonyl-bis-alkyl amines, diamine-diphenyl sulfones, diamino-benzophenones and N,N'-bis-(ω-amino-alkyl)-α,ω-alkane disulfonamides. Amines containing more than two reactive amino groups, either primary or secondary, such as diethylene triamine or triethylene tetramine, for example, yield branch chain polyurethanes. Such polymers, if they contain moderately branched chains, are of relatively low melting point. If the chains are highly branched the polymers approach and may even reach substantial infusibility.

The bis-chloroformates which are reacted with the above mentioned diamines may be obtained by reacting phosgene, i. e. carbonyl chloride, with a diol. The bis-chloroformates of diols such as ethylene glycol, trimethylene glycol and 1,4-butanediol, for example, are suitable. Higher glycols wherein the alkylene chain contains a greater number of carbon atoms and may be a straight chain or a branched chain are also satisfactory. Examples of other diols whose bis-chloroformates may be employed are ω,ω'-dihydroxyl-dialkyl ethers, ω,ω'-dihydroxy-dialkyl thioethers, bis-glycol or diglycol esters of straight chain or branched chain aliphatic dicarboxylic acids such as the bis-ethylene glycol ester of succinic acid, the bis-diethylene glycol ester of succinic acid, the bis-ethylene glycol ester of glutaric acid, the bis-ethylene glycol ester of adipic acid, the bis-ethylene glycol ester of pimelic acid, the bis-ethylene glycol ester of suberic acid, azelaic acid or sebacic acid, the diol, dimer or trimer esters obtained by the conversion of an excess of an aliphatic glycol with a dicarboxylic acid of the several aliphatic dicarboxylic acids mentioned above, ω,ω'-di-hydroxy-dialkyl ethers of hydroquinone, ω,ω'-di-hydroxy-dialkyl ethers of di-hydroxy cyclohexane, ω,ω'-sulfonyl-bis-alkanols, i. e. bis-(ω-hydroxyalkyl-sulfones), N, N'-(ω-hydroxyl-alkyl)-dicarboxyamides such as N, N'-(β,β'-dihydroxy-diethyl) - adipamide, cycloaliphatic glycols as cyclohexylene glycol, dihydroxy tetrahydrofurane, hydroxy - hydroxymethyl furane, hydroxy - hydroxymethyl-tetrahydrofurane, and dihydroxy-oxathiane dioxide.

Thus, the polyurethane may contain an alkylene linkage of two, three, four, five or more carbon atoms alternating with an alkylene linkage of two, three, four, five or more carbon atoms. For ready identification the alkylene polyurethanes may be identified as, 2,4-, 3,4-, 4,4-, 5,6-, 6,6-, etc. polyurethanes, the former numeral referring to the carbon chain length of the diamine employed while the latter refers to the carbon chain length of the bis-chloroformate. Mixed polyurethanes containing any type of intermediate linkage or grouping as brought out above may also be formed by employing any of the diamines and bis-chloroformate of the diols mentioned or a mixture of two or more different diamines or two or more different bis-chloroformates.

Pigmented polyurethanes may be readily obtained by introducing into the polymerization mixture a slurry or dispersion of a suitable pigment such as titanium dioxide, Franconia blue, Opaline green, or carbon black.

Acid materials that may be employed for interrupting the polymerization reaction by acidifying the reaction mixture include, for example, hydrochloric acid, sulfuric acid and phosphoric acid. Sufficient acid material should be added to the polymerization mixture to reduce its pH to less than about 6 or preferably less than about 5 to insure that no further polymerization will take place.

The following examples are given to illustrate this invention further.

*Example I*

To a cooled (0.5° C.) solution containing 18.5 parts by weight of 76% aqueous ethylene diamine and 5.3 parts by weight of tetramethylene diamine in 1023 parts by weight of water, which solution has been acidified with hydrochloric acid to the Congo red end point (pH 4), there is added a solution containing 66.7 parts by weight of butanediol bis-chloroformate, and 6 parts by weight of Igepon T in 1137 parts by weight of toluene. The mixture of solutions is stirred vigorously to produce an emulsion and a sufficient amount of a 25% by weight aqueous solution of sodium hydroxide is added thereto to bring its pH to between about 12 and 13. After 4 minutes of further stirring, during which time the temperature rises gradually from 2° to 12° C., the polymer slurry is filtered rapidly to separate the polymer from the unreacted monomers. After washing and drying, there is obtained 49.5 parts by weight of polymer or 80.9% of theory. The polymer is found to have a melting point of 196° C. and an intrinsic viscosity of 0.97.

When the polymerization is repeated, using a stirring time of 19 minutes, there is obtained 58 parts by weight of polymer or 94.8% of theory. The polymer in this case is found to have a melting point of 180° C. and an intrinsic viscosity of 0.44.

*Example II*

A polymerization is carried out in the manner set forth in Example I and the polymerization is stopped at the end of 4 minutes by the addition to the reaction mixture of sufficient 1:1 hydrochloric acid to reduce its pH to 4–5. After washing and drying, there is obtained 42.7 parts by weight of polymer or 69.8% of theory. The polymer is found to have a melting point of 201–2° C. and an intrinsic viscosity of 1.29.

*Example III*

To a cooled (2° C.) solution containing 26.4 parts by weight of tetramethylene diamine in 1,023 parts by weight of water, which solution has been acidified with hydrochloric acid to Congo red end point (pH 4), there is added a solution containing 66.7 parts by weight of butanediol bis-chloroformate, and 6 parts by weight of Igepon T gel in 1,137 parts by weight of toluene. The mixture of solutions is stirred vigorously to produce an emulsion and a sufficient amount of a 25% by weight aqueous solution of sodium hydroxide is added thereto to brings its pH to between 12 and 13. At the end of 4 minutes of stirring during which time the temperature rises gradually from 2 to 13° C., the polymerization is stopped by the addition to the reaction mixture of sufficient 1:1 hydrochloric acid to reduce its pH to 5. After washing and drying, there is obtained 54.7 parts by weight of polymer or 79.4% of theory. The polymer is found to have a melting point of 207° C. and an intrinsic viscosity of 1.50.

When the polymerization is repeated without acidification and using a stirring time of 4 minutes, followed by a 4 minute interval for separating the polymer from the reaction mixture, there is obtained 60.0 parts by weight of polymer or 87.0% of theory. This polymer in this case is found to have a melting point of 204° C. and an intrinsic viscosity of 1.22.

It is to be understood that the foregoing detailed description is given merely by way of illustration and that many variations may be made therein without departing from the spirit of my invention.

Having described my invention, what I desire to secure by Letters Patent is:

1. Process for the production of polyurethanes, which comprises forming a heterogeneous mixture containing in one phase a polyamine free from reactive groups other than amino groups and having at least one hydrogen atom attached to each nitrogen atom, and in another phase a bis-chloroformate free from reactive groups other than the chloroformate groups, effecting a polymerization reaction within said mixture between the polyamine and the bis-chloroformate to produce the polyurethane, and causing the halting of said polymerization reaction while it is still proceeding and before the same reaches the point of about 95% of the total theoretical yield of polymer being formed, said polymerization reaction being halted by adding an acid to the mixture.

2. Process for the production of polyurethanes, which comprises forming a heterogeneous mixture containing in one phase a polyamine free from reactive groups other than amino groups and having at least one hydrogen atom attached to each nitrogen atom, and in another phase a bis-chloroformate free from reactive groups other than the chloroformate groups, effecting a polymerization reaction within said mixture between the polyamine and the bis-chloroformate to produce the polyurethane, and causing the halting of said polymerization reaction while it is still proceeding and before the same reaches the point of about 95% of the total theoretical yield of polymer being formed, said polymerization reaction being halted by acidifying the reaction mixture to a pH of less than about 6.

3. Process for the production of polyurethanes, which comprises forming a mixture of an aqueous solution of a polyamine free from reactive groups other than amino groups and having at least one hydrogen atom attached to each nitrogen atom, and an organic solvent solution of a bis-chloroformate free from reactive groups other than the chloroformate groups, effecting a polymerization reaction within said mixture between the polyamine and the bis-chloroformate to produce the polyurethane, and causing the halting of said polymerization reaction while it is still proceeding and before the same reaches the point of about 95% of the total theoretical yield of polymer being formed, said polymerization reaction being halted by adding an acid to the mixture.

4. Process for the production of polyurethanes, which comprises forming a mixture of an aqueous solution of a polyamine free from reactive groups other than amino groups and having at least one hydrogen atom attached to each nitrogen atom, and an organic solvent solution of a bis-chloroformate free from reactive groups other than the chloroformate groups, effecting a polymerization reaction within said mixture between the polyamine and the bis-chloroformate to produce the polyurethane, and causing the halting of said polymerization reaction while it is still proceeding and before the same reaches the point of about 95% of the total theoretical yield of polymer being formed said polymerization reaction being halted by acidifying the reaction mixture to a pH of less than about 6.

5. Process for the production of polyurethanes, which comprises forming a mixture of an aqueous solution of tetramethylene diamine and a water-immiscible organic solvent solution of butanediol bis-chloroformate, effecting a polymerization reaction within said mixture between the polyamine and the bis-chloroformate to produce the polyurethane, and causing the halting of said polymerization reaction while it is still proceeding and before the same reaches the point of about 90% of the total theoretical yield of polymer by acidifying the reaction mixture to a pH of less than 5.

6. Process for the production of polyurethanes, which comprises forming a mixture of an aqueous solution of tetramethylene diamine and a water-immiscible organic solvent solution of butanediol bis-chloroformate, at a pH of between 12 and 13, effecting a polymerization reaction within said mixture between the polyamine and the bis-chloroformate to produce the polyurethane, and causing the halting of said polymerization reaction while it is still proceeding and before the same reaches the point of about 90% of the total theoretical yield of polymer by acidifying the reaction mixture to a pH of less than 5.

References Cited in the file of this patent

UNITED STATES PATENTS

| | | |
|---|---|---|
| 2,660,574 | Jones et al. | Nov. 24, 1953 |
| 2,708,617 | Magat et al. | May 17, 1955 |

FOREIGN PATENTS

| | | |
|---|---|---|
| 615,884 | Great Britain | Jan. 13, 1949 |
| 892,361 | France | Jan. 7, 1944 |
| 906,208 | France | May 7, 1945 |

OTHER REFERENCES

De Bell et al.: German Plastics Practice, De Bell & Richardson, 1946, page 519.